Feb. 10, 1931.  S. J. DICKEY ET AL  1,792,003
PETROLEUM TREATING SYSTEM
Filed Nov. 15, 1926
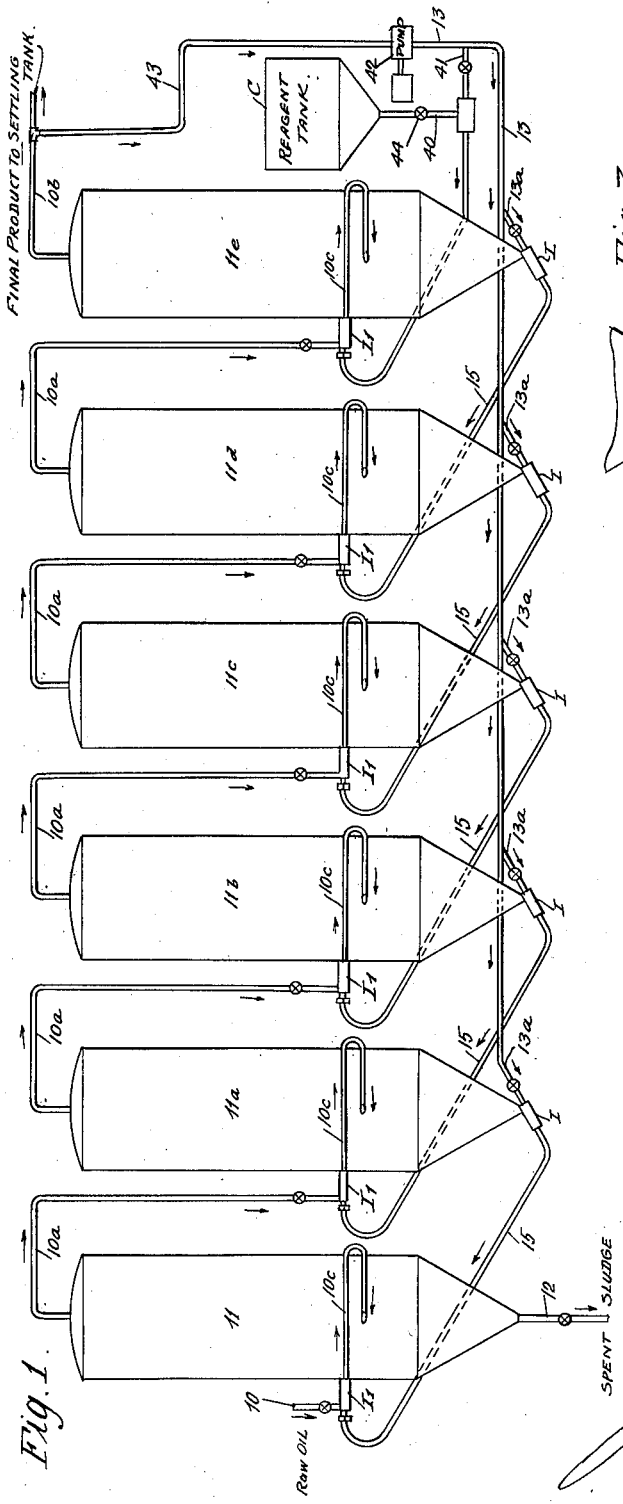
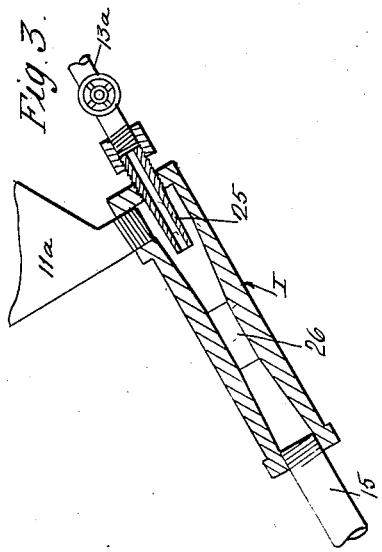
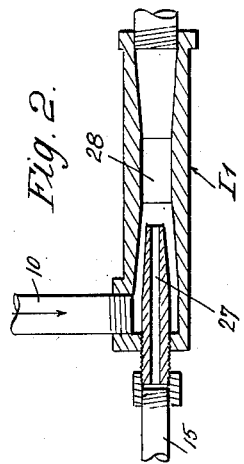
Inventors
Samuel J. Dickey
Ernest W. Roth.
Attorney.

Patented Feb. 10, 1931

1,792,003

UNITED STATES PATENT OFFICE

SAMUEL J. DICKEY AND ERNEST W. ROTH, OF LOS ANGELES, CALIFORNIA, ASSIGNORS TO GENERAL PETROLEUM CORPORATION OF CALIFORNIA, A CORPORATION OF DELAWARE

PETROLEUM-TREATING SYSTEM

Application filed November 15, 1926. Serial No. 148,340.

This invention has to do most broadly with the treatment of one fluid by another; but as the method and apparatus have been designed particularly with a view to the treatment of petroleum or similar oils with treating fluids such as reagents, the invention will be explained in detail as applied for those purposes, but without intending thereby to limit the invention specifically to such use except as may be specifically so stated in the appended claims.

In treating petroleum oils or derivitives therefrom to produce such products as gasoline, kerosene, lubricating oils, etc., it has been found necessary and is a practically universal practice to subject such oils to the action of reagents for the purpose of removing foreign compounds and for decolorizing, clarifying and deodorizing. Thus it has been common in the past to treat such oils with sulphuric acid and then subsequently with a suitable clay or adsorbent earths. The reasons why such reagents or materials are used, and their specific reactions upon the oils, need not here be gone into as those are well known. It is not an object of the present invention to provide any new reagent or new reaction with the oils, but to provide an efficient method and apparatus whereby such reagents may be used to perform their functions in the highest degree of efficiency and economy.

With the foregoing purposes in view, we have devised a system in which the reagent is carried successively, through a progressive scheme of transfer of the oils and reagent, into several successive intimate contacts with the oils, and in such a manner that the reagent, whatever it may be, is utilized to its fullest extent and the final oil product is delivered in the highest possible state of clarification, deodorization, or decolorization, as the case may be.

The subject matter of this application is similar in its general aspects to applications filed by applicant Samuel J. Dickey, Serial Number 613,064, January 16, 1923, Method of and apparatus for treating one liquid by another, and Serial Number 713,339, filed May 14, 1924, apparatus for treating one liquid by another. The present application, however, embodies several improvements over and above the methods and apparatus of the previous applications, although in general the system of maintaining several separate bodies of oil, and treating them successively with the same body of reagent, and maintaining opposite flows of oil and reagent through the whole system, are substantially the same.

For the purpose of explaining the present invention in preferred detail, both as to apparatus and method, we refer to the accompanying drawings, in which:

Fig. 1 is a diagram illustrating a suitable apparatus arrangement for carrying on the method;

Fig. 2 is a detailed section of one of the mixing injectors used in the system; and Fig. 3 is a detailed section of another mixing injector used in the system.

In Fig. 1 the raw oil first enters the system by pipe 10, going first into tank 11 and thence, as will be hereinafter described, into and through the several other tanks 11a, 11b, 11c, 11d, 11e. We may here state that the complete system will be made up of any suitable number of these tanks 11 and that in preferred practice the several tanks and their accompanying appurtenances will be substantially duplicates of each other. Also we may note at the outset that what we refer to as raw oil entering the system is in any case oil that is to be treated in the system, whether raw or acid treated oil. If the system is used for subjecting the oil to an acid treatment, then the raw oil will usually be a distilled petroleum product; or if the system is used for subjecting the oil to a clay treatment, the raw oil may have been previously acid treated or may not have been treated at all.

Each of the tanks may preferably have a conical bottom and tank 11 has a valve controlled outlet pipe 12 through which the exhausted reagent sludge is finally removed from the system. If clay treating is being carried on the spent clay may be forced by the pressure within the system to a filter press or other separating means. The other tanks of the system have at their bottom injectors, I, connected to gasoline line 13, whose function is to draw sludge from the bottom of the several tanks, by the force of the stream of gasoline passing therethrough, and discharge the mixture of sludge and gasoline through the several pipes 15 to the injector I—1 of the tank immediately preceding in the series. Thus the injector at the bottom of tank 11e delivers this mixture through pipe 15 to the injector I—1 of tank 11d; and injector I at the bottom of tank 11d delivers its mixture to injector I—1 of tank 11c, and so on throughout the series.

Although injectors I—1 are shown in the drawings, it must be stated that they are not necessary to the operation of the system. These injectors are shown as delivering their mixture through the return bend tube 10c into the respective tanks. The return bend tubes 10c preferably enter the bend tangentially; the passage of the fluid through the return bend tube causes a thorough admixture of the fluids; and furthermore the circular motion set up in the tanks by reason of the tangential entry also causes admixture. The injectors I—1 are thus not necessary for causing admixture; neither are they necessary for causing the flow of oil from the pipes 10 or 10ᵃ into the respective tanks, as the flow of oil is caused by a pressure head. Consequently, wherever hereinafter we refer to the injector I—1, it should be borne in mind that although preferably they may be used, they are not necessary to the operation of the system.

The raw oil first entering at pipe 10 goes to injector I—1, where the fluid flowing through pipe 15 is, by the action in that injector, thoroughly admixed with the raw oil, and the admixture is delivered into tank 11, causing a considerable agitation therein at a level above that at which the sludge in the tank normally accumulates. For purposes of description (although this may not always be actually the case in practical operation) it may be considered that each tank during operation contains oil, more or less free from reagent and sludge, from the level of injector I—1 to its top, and contains oil mixed with a large proportion of reagent sludge from the level of injector I—1 down. Or the body of liquid in each tank during operation may be considered as a body of oil comparatively free from reagent in its uppermost parts, but admixed with a comparatively large proportion of reagent or reagent sludge in its lowermost parts.

From the top of each tank the comparatively reagent-free oil passes over by pipe 10a to the middle portion of the next tank. If injectors I—1 are not used this oil is merely joined with the mixture flowing through pipe 15 before entering the return bend tube 10c. In any case the admixture of oil and the mixture from pipe 15 enters the middle portion of the next tank. When the treated oil finally passes off from the last tank 11e through pipe 10b it may then pass to a final filter or settling tank where the last remaining reagent or material may be effectively removed. It is, of course, well understood that a final operation of filtering or settling may follow after clay treatment or acid treatment of oil to remove the final traces of reagent; and that after acid treatment the acid treated oil may or may not first be put through a neutralizing treatment before next being treated with clay to remove all traces of the acid sludge. Such sequences of operation, however, have nothing to do with the present invention; in fact, oil may be clay treated before having any acid treatment.

For the purpose of forming a suitable reagent mixture for introduction to the system, the reagent, which is placed in a suitable tank or container C, may be drawn by an injector I through pipe 40 from that tank. This injector is fed with gasoline under pressure from gasoline line 13 by branch pipe 41, the pressure in the gasoline being raised, for instance, by a pump 42. And this pump draws its gasoline through line 43 from the last tank 11e, or from any other suitable source from which it may obtain a purified oil. We refer to line 13 as being a gasoline line because in a typical case it is gasoline that is being purified in the system described. Generally speaking, the line 13 will contain a suitable reagent carrying liquid such as treated or purified oil, or other fluid under pressure. For instance, if the oil pressure in the several tanks is maintained at about 40 pounds per square inch, the pressure in the gasoline line may be maintained at say about 100 pounds per square inch. The proportions and amount of reagent and oil or gasoline in the mixture delivered to the last tank 11e are controllable by the valves 44. It will be noted that, by the operations just described, only purified oil and pure reagent are delivered into this last tank, no reagent sludge being delivered into it. If an acid reagent is being used, the acid is placed in tank C without any admixture of oil. If a reagent clay is being used it will be mixed in tank C with sufficient purified oil to fluidize the clay.

Injector I at the bottom of each tank obtains its gasoline or purified oil from line 13 through a valve controlled branch 13a connecting with the inner nozzle 25. The outer nozzle 26 of the injector connects at the bottom of its corresponding tank; and the action of fluid under pressure forced through nozzle 25 is to draw fluid from the bottom of the tank, force it through nozzle 26, and the nozzles are so constructed and relatively arranged that the two fluids, in passing through the nozzle, are forced into admixture and a turbulence is set up that continues through pipe 15, so that the two fluids are thoroughly admixed by the time they reach injector I—1 or return-bend tube 10c.

Injector I—1 may be in structure similar to injector I, its inner nozzle 27 obtaining its fluid under pressure from pipe 15 and its outer nozzle 28 obtaining its fluid from pipe 10 or 10a, as the case may be; the mixture of fluids set up in the injector being projected tangentially into the corresponding tank through return-bend tube 10c.

When the system is in operation each of the tanks 11 to 11e is full of fluid and the fluid is constantly flowing out the top of each tank into the middle portion of the next one. The oil entering the middle portion of each of the tanks except the last is mixed with a reagent and reagent sludge and oil mixture coming from the bottom of the tank immediately succeeding (that is, from the bottom of the tank into which the oil flows from the tank under consideration). As the oil enters the last tank it is admixed with a mixture of pure reagent and purified oil. Thus, in each one of the tanks, as the oil flows successively through them, the oil is treated with the reagent and as the oil flows from tank to tank towards the last tank 11e it is becoming more nearly purified. At the same time in each one of the tanks the oil is being mixed with a more and more pure reagent. The reagent or reagent mixture, for instance, that is forced into tank 11e is a mixture made up of pure oil from tank 11e and of fresh reagent from container C. On the other hand, the reagent mixture that is forced into tank 11d is made up of the reagent sludge that settles to the bottom of tank 11e together with purified oil from line 13. Thus from the bottom of each tank the reagent sludge is withdrawn and put into the tank immediately preceding; so that each preceding tank is supplied with a more nearly spent reagent sludge than are successive tanks. Thus the reagent mixture that is supplied to tank 11 is the most nearly spent of all the reagent mixtures. That most nearly spent reagent mixture is put into contact with the most raw oil, where, in the nature of the case, the nearly spent reagent mixture can react to more advantage and spend itself as nearly completely as possible. On the other hand, the reagent mixture that goes into the last tank or tanks is pure and of the highest degree of activity; so that, in contact with the most nearly purified oil, it acts to bring that oil to the highest state of purification. In the drawings tank 11e is shown as the last one into which reagent is positively introduced. Tank 11e, of course, has a certain amount of reagent in it carried over from tank 11d through pipe 10a; and in tank 11e there is a certain amount of separation of oil and reagent sludge; but the reagent sludge from tank 11e is the purest or least spent of all the reagent sludges dropping out of the several tanks; so that the reagent sludge and oil mixture that goes to tank 11d is comparatively pure and little spent. The sludge that drops to the bottom of tank 11d contains reagent that is somewhat more spent; and so the sludge and reagent mixture that is forced into tank 11c is again more spent than that which is forced into tank 11d; and the reagent mixture in tank 11c coming into contact with less pure oil, the reagent sludge therein thrown down is again more nearly spent. And thus the procedure goes on until, as we have before mentioned, the most nearly spent reagent mixture is finally put into tank 11 which contains the most raw oil.

It will be understood, of course, that the various proportions of fresh reagent, reagent sludge, oil, etc., may be controlled by proper valvular arrangements, such as indicated in the drawings, so that the relative amounts and relative freshness or dissipation of the reagent mixture put into each individual tank may be regulated to any desired degree. The amount of fresh reagent is initially regulatable at valves 44. The injectors I are so regulated as to take the sludge off from each tank as fast as it accumulates there. Consequently the initial regulation at 44 determines the amount of reagent that goes through the system; while the design and proportions of injectors I, and their valvular regulation, regulate the amount of sludge transferred from one tank to the next and the proportion of purified oil or other fluid in the sludge mixture transferred.

It will be seen that the above described system involves not only a method of transferring reagents in such a manner that the same body of reagent is used over and over again with the purest reagent in contact with the most nearly purified oil; but also involves a method of transferring the reagent from oil body to oil body without the reagent coming into contact with the pump or other pressure raising means. The transfer of reagent as described is effected by means of the pressure in the gasoline line 15; that pressure being high enough to effect the transfer of the reagent or reagent sludge from one tank to another. It is also to be noted that any suitable fluid can be used in line 13. It is preferable, of course, to use a fluid which will not contaminate the oil being purified, and, if liquid is used in that line, thus to use the purified oil itself. On the other hand, gas under pressure may be used in the pressure line 13. For instance, in the purification of petroleum oils the use of an actual gas in that pressure line will not contaminate the oils.

We claim:

1. The method of purifying a liquid with a reagent, that includes repeatedly and successively forming admixtures of the liquid with a mixture of finally purified liquid and reagent sludge, which reagent sludge is drawn from said admixtures, and successively treating the liquid with mixtures containing successively higher percentages of unexhausted reagent.

2. The method of purifying oil by action with a reagent, that includes maintaining several bodies of such oil through which the oil flows in series, introducing to the last body of such oil a mixture of purified oil and a fresh reagent, and introducing to each of the preceding bodies of oil a mixture of said purified oil together with reagent sludge drawn in each instance from the relatively next succeeding body of oil.

3. The method of purifying oil by action with a reagent, that includes maintaining several bodies of such oil through which the oil flows in series, introducing to the last body of such oil a mixture of purified oil and a fresh reagent, and introducing to each of the preceding bodies of oil a mixture of said purified oil together with reagent sludge drawn in each instance from the relatively next succeeding body of oil, and treating the oil in the successive bodies with mixture containing successively higher percentage of unexhausted reagent.

4. The process of purifying oil by action with a reagent, that includes maintaining several successive bodies of such oil by flowing the oil through them in series, introducing into the last of said bodies a mixture of fresh reagent and purified oil, and introducing into each of the preceding bodies a mixture of purified oil and reagent sludge drawn in each instance from the immediately succeeding body.

5. The process of purifying oil by action with a reagent, that includes maintaining several successive bodies of such oil by flowing oil through them in series, introducing into the last of said bodies a fresh reagent, and introducing into each of the other bodies a mixture of purified oil and reagent sludge, which reagent sludge is, in each instance drawn from the immediately succeeding body.

6. The method of purifying oil by action with a reagent, that includes maintaining several bodies of said oil by flowing the oil through them in series, maintaining a pressure on a part of the purified oil flowing from the last of said bodies, mobilizing a fresh reagent with said purified oil under pressure and introducing said fresh reagent together with such purified oil into the last body of said series, and mobilizing and transferring reagent sludge from each of said bodies into the next preceding one of said bodies.

7. The process of purifying oil by action with a reagent, that includes maintaining several successive bodies of such oil by flowing the oil through them in series, maintaining under pressure a body of reagent carrying oil which when introduced to the several bodies of oil will not contaminate the oil, mobilizing and introducing a fresh reagent into the last of said bodies by means of said reagent carrying oil under pressure, and mobilizing and transferring sludge from each of said bodies into the relatively next preceding body, by means of said reagent carrying oil under pressure.

8. Apparatus for the herein described method, comprising a series of tanks, means to introduce oil to the medial portion of the first tank of said series, means to pass oil from the upper end of each tank to the medial portion of the next succeeding tank in the series, a pressure line, means for raising a pressure on and mobilizing fluid in said line, injector means operating from said pressure line and adapted to inject fresh reagent into the last tank in said series, an injector means in association with each of said tanks except the first, operating from said pressure line, and adapted to inject reagent sludge from the bottom of each said tank into the medial portion of the next preceding tank in the series.

9. Apparatus for the herein described method, comprising a series of tanks, means to introduce oil to the medial portion of the first tank of said series, means to pass oil from the upper end of each tank to the medial portion of the next succeeding tank in the series, a pressure line, means for maintaining under pressure in said line purified oil from the last tank in said series, injector means operated from said pressure line and adapted to inject fresh reagent into the medial portion of the last tank in said series, and injector means in association with each of the tanks except the first, operated from said pressure line, and adapted to draw reagent sludge from each of said tanks and inject it along with purified oil from said pressure line into the immediately preceding tank in said series.

In witness that we claim the foregoing we have hereunto subscribed our names this 4th day of November, 1926.

SAMUEL J. DICKEY.
ERNEST W. ROTH.